United States Patent [19]

Rowley

[11] Patent Number: 4,773,348
[45] Date of Patent: Sep. 27, 1988

[54] BOAT FENDER HOLDER

[76] Inventor: William W. Rowley, 11524 Wilbert Rd., Chardon, Ohio 44024

[21] Appl. No.: 914,178

[22] Filed: Oct. 1, 1986

[51] Int. Cl.$^4$ .............................................. B63B 59/02
[52] U.S. Cl. ................................ 114/219; 248/311.2; 211/118; 211/195; 114/343
[58] Field of Search ............... 114/190, 218, 219, 360, 114/343, 364; 248/291, 311.2, 317, DIG. 7; 211/85, 116, 118, 195

[56] References Cited

U.S. PATENT DOCUMENTS

| | | | |
|---|---|---|---|
| 883,162 | 3/1908 | Baecker | 211/116 |
| 3,186,555 | 6/1965 | Ventura | 248/DIG. 7 |
| 3,391,891 | 7/1968 | Garden | 248/311.2 |
| 4,014,056 | 3/1977 | Wainwright | 114/364 |
| 4,191,350 | 3/1980 | Ormond | 248/311.2 |
| 4,290,529 | 9/1981 | Jones et al. | 248/311.2 |
| 4,324,381 | 4/1982 | Morris | 248/311.2 |
| 4,526,124 | 7/1985 | Hartwell | 114/219 |

Primary Examiner—Joseph F. Peters, Jr.
Assistant Examiner—Stephen P. Avila
Attorney, Agent, or Firm—Renner, Otto, Boisselle & Sklar

[57] ABSTRACT

A collapsible boat fender holder is disclosed. The boat fender holder has two configurations, one for shipping or storage and the other for use in holding a boat fender. The holder is formed entirely of plastic members which are held together, preferably, with non-corrosive fasteners. The holder for each fender includes a frame member with two parallel legs and an arcuate section joining them. A pair of rings encircle each boat fender and are pivotably mounted at diametrically opposite locations to the legs of the frame member. Four links, two connected with each leg of the frame members, connect the two frame members to each other. The links and legs together define two parallelograms. When in the operative condition, the links and legs are essentially mutually perpendicular and the rings are perpendicular to the axis of the legs so that a boat fender may be inserted through the rings to rest on the bottom arcuate section of the frame member. A pair of removable straps, one connected between each pair of rings, holds the rings in this position. For shipping, the straps are removed, and the assembly is collapsed so that the two U-shaped frames lie nearly one on top of the other but laterally offset. The links and legs of the parallelograms are no longer mutually perpendicular, instead, alternate angles of the parallelograms are acute and obtuse. Similarly, in the collapsed position the rings are rotated to be more nearly parallel to the legs of the U-shaped frame members.

20 Claims, 3 Drawing Sheets

BOAT FENDER HOLDER

FIELD OF THE INVENTION

The present invention relates to holders for boat fenders.

BACKGROUND OF THE INVENTION

Boat fenders are large, bulky items which can get in the way unless properly stowed. For this purpose, boat fender holders have been designed which can be secured to a railing on the boat. Prior known boat fender holders have been made of stainless steel. A boat fender holder made of stainless steel is shipped disassembled and requires numerous nuts and bolts to be attached to hold the components together. In addition, the stainless steel fender holder can be rather easily dented or bent out of shape, and if not made entirely of stainless steel, rust is a distinct problem.

BRIEF SUMMARY OF THE INVENTION

The present invention provides a new and improved boat fender holder which is made entirely of plastic (except for stainless fasteners) and hence will not rust or dent. Upon removal of two frame members, the fender holder of the present invention may be collapsed to an essentially flat configuration so that it may be easily shipped in a relatively small package. Upon receipt, the customer need only re-install the two support brackets, and the holder is ready for installation on his boat.

In a preferred embodiment, the boat fender holder of the present invention is formed to store two boat fenders in a side-by-side arrangement. Each fender is held in place by a frame member having a pair of vertical legs connected by an arcuate bottom portion. Two rings are connected to each frame member. The rings are parallel to each other and one above the other. The legs of the frame members are fastened to the respective rings at diametrically opposite locations and the support brackets extend one between each pair of rings and parallel to the frame member legs to keep the rings parallel. Each assembly of frame member, rings, and support bracket defines a cylindrical space with a curved bottom to receive a boat fender. Two or more such assemblies are linked to each other by a pair of horizontal tubes so that the vertical legs and horizontal tubes on each side of the rings form parallelograms. The boat fender holder may be conveniently collapsed for shipping. In the operative condition, the parallelograms are squares; in the shipping position the support brackets are removed and the parallelograms are flattened.

The invention, then, comprises the features hereinafter fully described and particularly pointed out in the claims, the following description and annexed drawings setting forth in detail an illustrative embodiment of the invention, this being indicative, however, of but one of the various ways in which the principles of the invention may be embodied.

DESCRIPTION OF PREFERRED EMBODIMENT

Figure 1:
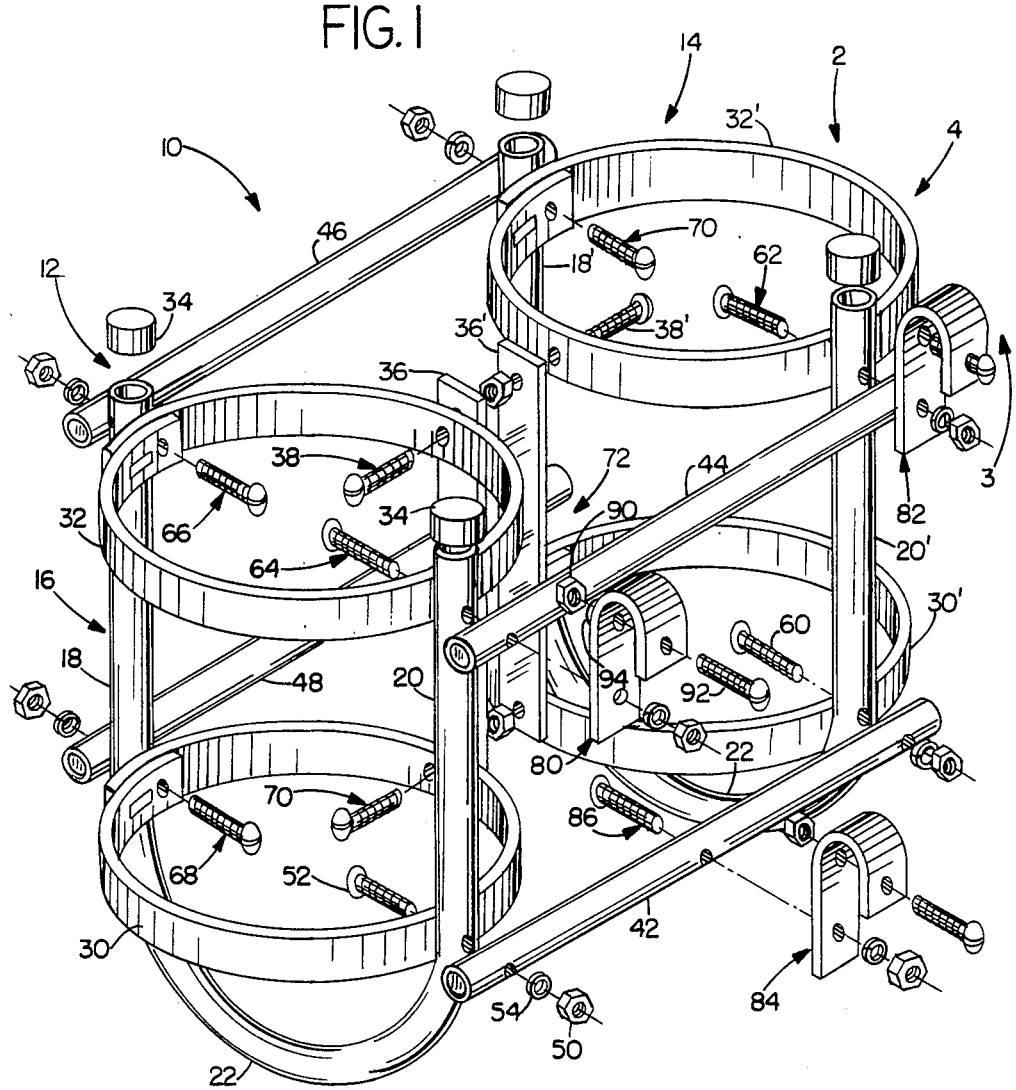
FIG. 1 is an exploded perspective illustration of a boat fender holder constructed in accordance with the present invention.
Figure 6:
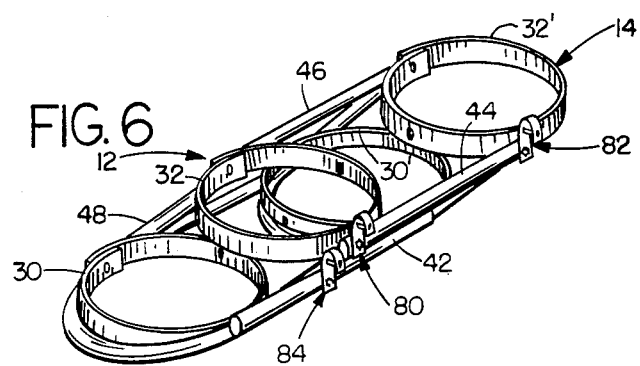
FIG. 6 shows the fender holder of FIG. 1 in a collapsed configuration for shipment.
Figure 2:
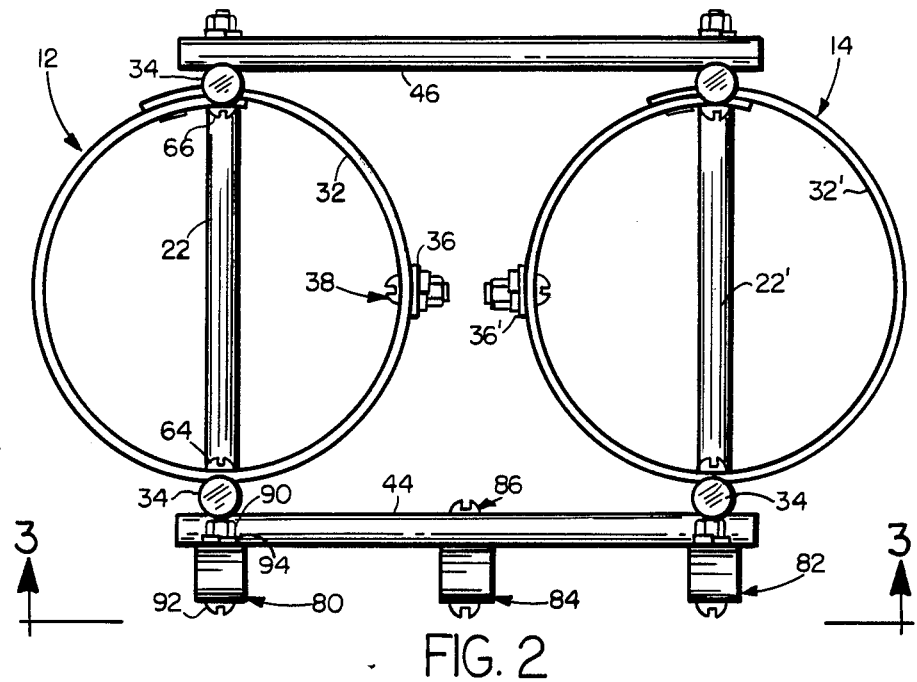
FIG. 2 is a plan view of the holder of FIG. 1.
Figure 3:
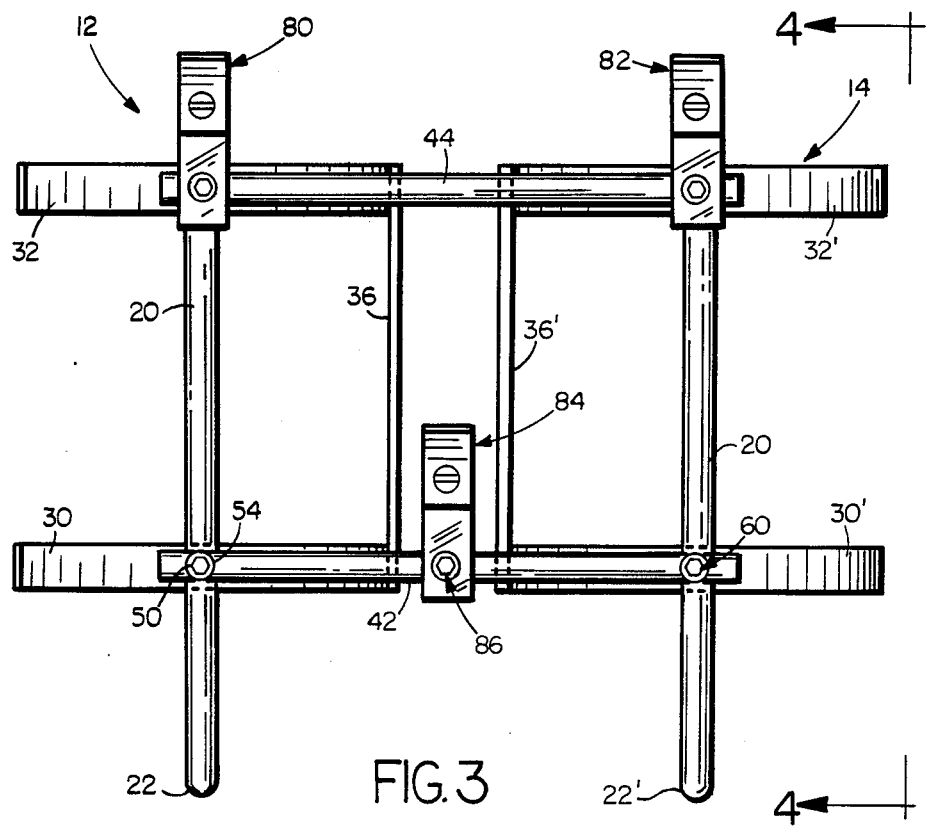
FIG. 3 is a view looking in the direction of the arrows 3—3 of FIG. 2.
Figure 5:
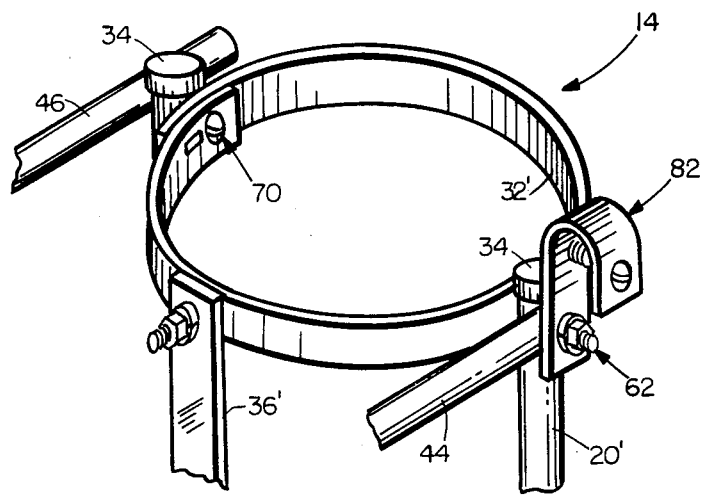
FIG. 5 is an assembled view of a portion of the fender holder of FIG. 1.
Figure 4:
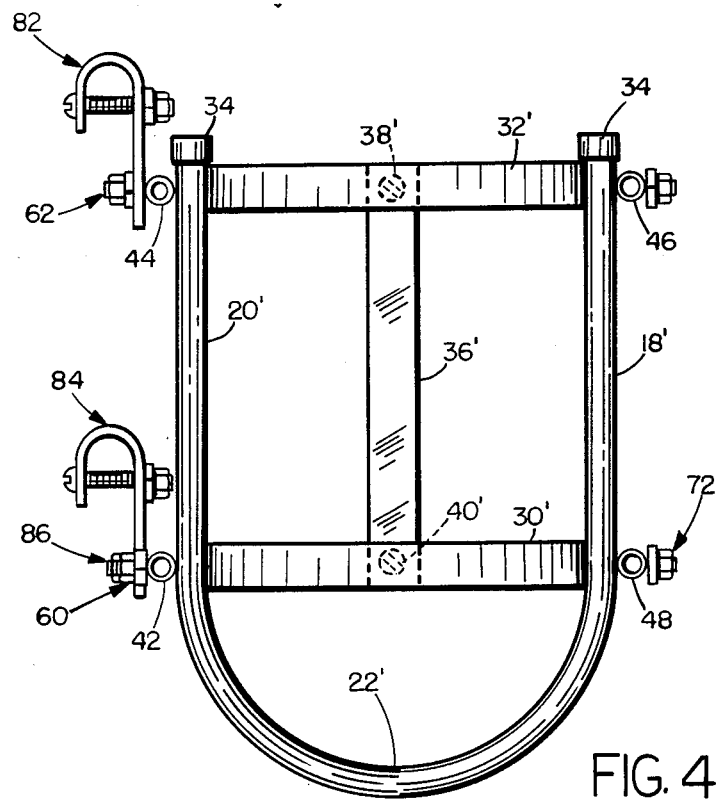
FIG. 4 is a view looking in the direction of the arrows 4—4 in FIG. 3.

The boat fender holder 10 of FIG. 1 is designed to collapse easily from the configuration shown in FIGS. 1-5 in which it is suitable for receiving and holding a pair of boat fenders and the collapsed configuration of FIG. 6 suitable for shipping or storage of the boat fender holder. To this end the boat fender holder 10 includes a pair of holder assemblies 12 and 14. Only the holder assembly 12 will be described in detail, the holder assembly 14 being generally similar and being given corresponding reference numerals with a prime (') added.

The holder assembly 12 (FIGS. 1-5) includes a frame 16 formed of a single plastic tube. The frame 16 has two legs 18 and 20 joined by an arcuate section 22. The legs 18 and 20 are generally parallel and coplanar. When in the FIG. 1 configuration, the arcuate section 22 supports the bottom of a boat fender to limit its axial movement downward of the holder assembly 12.

A pair of rings 30 and 32 with the same diameter are connected at diametrically opposite locations to the insides of legs 18 and 20. The rings 30 and 32 may be proportioned to accomodate fenders of different diameters. For example, one size of rings 30 and 32 could accomodate fenders of up to seven inches in outside diameter, another size could accomodate fenders from seven to nine inches in outside diameter, and a final size could accomodate fenders from nine to eleven inches in outside diameter.

The rings 30 and 32 are formed of a flat strap of plastic having a rectangular cross section. Ring 30 is located just above the transition between the arcuate section 22 and the legs 18 and 20. The ring 32 is connected to legs 18 and 20 just far enough below the top of the legs that caps 34 can be fitted onto the legs to block the entry of water. In the FIG. 2 configuration the rings 30 and 32 are approximately parallel to each other and perpendicular to the legs 18 and 20.

A strap or support member 36 is connected between the rings 30 and 32 and held in place by nut, bolt, and lock washer assemblies 38 and 40. The strap 36 is positioned halfway around the rings 30 and 32 from the legs 18 and 20, and is parallel to the legs. The strap 36 is formed of the same plastic strap material as the rings 30 and 32, and when it is tightened up against the rings, the flat surface of the strap keeps the rings parallel to each other.

The two holder assemblies 12 and 14 are joined by links 42, 44, 46 and 48 which, because of the geometry of the boat fender holder 10, remain essentially parallel with each other at all times. The link 42 is held to leg 20 by nut 50, bolt 52, and lock washer 54. The bolt 52 passes through ring 30, leg 20, and link 42 to form a pivotable connection. Similar nut, bolt and lock washer assemblies 60, 62, 64, 66, 68, 70, and 72 secure the remaining joints of the boat fender holder 10. While the nut, bolt and washer assemblies used in the boat fender holder assembly are shown as having lock washers, other suitable vibration resistant fasteners could be used such as bolts with self-locking nuts or rivets (in some places). Additionally, because of the marine environment in which the boat fender holder assembly 10 will be used, the metal hardware is preferably made from stainless steel, bronze, plastic or another non-corrosive material.

The frame 16, rings 30 and 32, strap 36, and links 42, 44, 46 and 48 are all made from the same type of plastic. A high density polyethylene such as Philips 4093, with a suitable ultraviolet inhibitor, such as Allied 10139 pigment.

Three hanger hooks 80, 82, and 84 are provided for securing the boat fender holder 10 to the railing of a boat. The upper two hooks, 80 and 82, are mounted by means of nut and bolt assemblies 62 and 64 while the hook 84 is mounted midway along link 42 by means of nut, bolt and washer assembly 86. The hook 80 has a nut 90, bolt 92, and lock washer 94 to close its opening to thereby secure it to a boat railing. Similar nut, bolt, and washer assemblies are provided on the remaining hooks 82 and 84.

The links 42 and 44 and leg 20 together with the corresponding leg of holder assembly 14 form a parallelogram. Similarly, the leg 18 and the corresponding leg of holder assembly 14 together with links 46 and 48 form a parallelogram. As shown in FIGS. 1-5 in the operative configuration, the links and legs are essentially perpendicular to each other to define rectangles.

The boat fender holder 10 is shipped with straps 36 and 36' (the corresponding strap from holder assembly 14) removed and with the nut and bolt assemblies 50-54, 60-72 in place but not fully snugged. In this condition the entire boat fender holder 10 may be collapsed to the configuration shown in FIG. 6. The parallelograms flatten out so that the angle between link 42 and leg 52 is no longer perpendicular but is an acute angle, while the angle between leg 20 and link 44 is obtuse. In addition, the rings 30 and 32 and their counterparts on holder assembly 14 are rotated to a flattened position approximately parallel to the links 42 and 44.

In this collapsed position the boat fender holder 10 may be shipped in a substantially smaller box than would be possible in its non-collapsed configuration. Additionally, because the components are made of plastic the nuts and bolts which are part of the assembly when shipped may be partially tightened against the plastic which is sufficiently yieldable to keep them from vibrating loose during shipment. At the same time upon arrival the purchaser may readily resurrect the boat fender holder to its operative condition, tighten the nuts and bolts and mount the strap 36 and its counterpart from holder assembly 14 and place the fender holder 10 in use.

While the boat fender holder 10 has been shown and described with two holder assemblies 12 and 14, one or more additional holder assemblies could be added. This could be done simply be extending the links 42, 44, 46 and 48 to accomodate the one or more additional holder assemblies.

What is claimed is:

1. A collapsible boat fender holder comprising a frame assembly having frame members pivotably connected to form front and rear parallelograms, at least two pairs of rings for encircling boat fenders, diametrically opposite points on each ring being connected with corresponding portions of the front and rear parallelograms, the frame assembly being shiftable between a first position in which adjacent frame members are generally perpendicular and the rings of each pair are generally coaxial to receive a boat fender and a second, collapsed position in which the angles formed by alternate pairs of adjacent frame members are acute and obtuse.

2. The boat fender holder of claim 1 further including means for maintaining the frame assembly in the first position.

3. The boat fender holder of claim 2 wherein the means for maintaining the frame assembly in the first position includes a pair of straps each being mounted between the rings of one of the pairs of rings.

4. The boat fender holder of claim 3 in which the rings are formed of a band material having a rectangular cross section.

5. The boat fender holder of claim 1 in which the front and rear parallelograms are connected to each other by curved frame portions.

6. The boat fender holder of claim 5 in which the curved portions limit axial movement of a boat fender received in a pair of rings.

7. The boat fender holder of claim 5 wherein each of the curved frame portions is integrally formed with one frame member from the front parallelogram and one frame member from the rear parallelogram.

8. The boat fender holder of claim 5 in which the rings are of substantially uniform diameter and the curved portions have a diameter slightly larger than the ring diameter.

9. The boat fender holder of claim 8 in which the frame members and rings are formed of plastic.

10. The boat fender holder of claim 9 wherein the frame members are formed of plastic tubing and the rings are formed from plastic strapping having a rectangular cross section.

11. A boat fender holder having two configurations, one for shipping or storage and the other for use in holding a boat fender, said holder having first and second frame members, each frame member having two parallel legs and an arcuate section joining them, two pairs of rings for encircling a boat fender, each of the rings of one pair being pivotably mounted at diametrically opposite locations to the legs of the first frame member and each of the rings of the second pair being pivotably mounted at diametrically opposite locations to the legs of the second frame member, all of the rings being pivotable between a first configuration in which the rings are perpendicular to the respective legs to receive a boat fender and a second configuration in which the rings form acute angles with the respective legs whereby the holder is nearly flat to facilitate shipment, removable means for holding the rings in the first configuration, and four links extending two between each of the legs of the first frame member and the legs of the second frame member, the links and legs defining a pair of parallelogram linkages.

12. The boat fender holder of claim 11 including means for mounting the boat fender holder to an adjacent structure.

13. The boat fender holder of claim 11 wherein the rings and frame members are formed of plastic.

14. The boat fender holder of claim 13 wherein the rings are formed of flat strap material.

15. The boat fender holder of claim 14 wherein said removable means includes a flat strap and means for securing the flat strap against a flat side of the rings.

16. A boat fender holder having two configurations, one for shipping or storage and the other for use in holding a boat fender, said holder having a frame member formed from plastic tubing, said tubing being formed into two parallel legs which are generally vertical when the boat fender holder is configured to hold a boat fender and a section connecting the two parallel legs, a pair of plastic rings formed of strap-like material having a generally rectangular cross section for encircling a boat fender, each of the rings being pivotably mounted at diametrically opposite locations to the leg portions of the frame member and pivotable between a first configuration in which the rings are perpendicular to the legs to receive a boat fender and a second configuration in which at least one of the rings forms an acute angle with the legs whereby the holder is nearly flat to facilitate shipment, and removable strap means for holding the rings in the first configuration.

17. The boat fender holder of claim 16 wherein said removable strap means includes a strap having at least one generally flat surface and removable fastener means for securing the flat surface of said strap in abutting engagement with an outside flat surface of each of the rings whereby the rings are held generally parallel to each other.

18. The boat fender holder of claim 16 wherein the section of the frame member connecting the two legs is generally semicircular, and one of said rings is mounted to the frame member at diametrically opposite locations adjacent the juncture between the legs and opposite ends of the semicircular portion whereby one of the rings so mounted may be folded flat and snugly received within the curve of the semicircular portion.

19. The boat fender holder of claim 18 wherein said removable strap means includes a strap having at least one generally flat surface and removable fastener means for securing the flat surface of said strap in abutting engagement with an outside flat surface of each of the rings whereby the rings are held generally parallel to each other.

20. The boat fender holder of claim 16 including a second frame member formed from plastic tubing, said tubing of said second frame member being formed into two parallel second legs which are generally vertical when the boat fender holder is configured to hold a boat fender and a second section connecting the two parallel second legs, a second pair of plastic rings formed of strap-like material having a generally rectangular cross-section for encircling a boat fender, each of the second rings being pivotably mounted at diametrically opposite locations to the second leg portions of the second frame member and pivotable between a first configuration in which the second rings are perpendicular to the second legs to receive a boat fender and a second configuration in which at least one of the second rings forms an acute angle with the second legs whereby the holder is nearly flat to facilitate shipment, removable strap means for holding the rings in the first configuration, and at least four links, one end portion of each link being connected to one of the legs of the frame member and the other end portion of each of the links being connected with one of the second legs of the second frame member, the links and legs of each adjacent pair of boat fender holders defining a pair of parallelogram linkages.

* * * * *